No. 891,160. PATENTED JUNE 16, 1908.
W. H. GOLDTRAP.
PLOW.
APPLICATION FILED JUNE 15, 1907.

WITNESSES
E. G. Bromley
John K. Blackwell

INVENTOR
William H. Goldtrap
BY Munn & Co
ATTORNEYS

UNITED STATES PATENT OFFICE.

WILLIAM H. GOLDTRAP, OF COTULLA, TEXAS.

PLOW.

No. 891,160.

Specification of Letters Patent.

Patented June 16, 1908.

Application filed June 15, 1907. Serial No. 379,128.

*To all whom it may concern:*

Be it known that I, WILLIAM H. GOLD-TRAP, a citizen of the United States, and a resident of Cotulla, in the county of Lasalle and State of Texas, have invented a new and Improved Plow, of which the following is a full, clear, and exact description.

This invention relates to plows, and more particularly to plows used in growing onions and other vegetables, and the like.

The object of the invention is to provide a simple, strong and durable plow having wheels adjustable to the width of the rows to be plowed, and presenting handles by means of which the plow-shares can be moved into inoperative positions.

A further object of the invention is to provide a plow having a plurality of plow-shares operatively engaged by an adjustable frame, which can be operated to regulate the position of the plows, and in which the plow-shares are removably and adjustably secured to the brackets which carry them.

A further object of the invention is to provide a plow having removable plow-shares which can be replaced by hoe or cultivator blades, or harrow teeth and the like.

The invention consists in the construction and combination of parts to be more fully described hereinafter and particularly set forth in the claims.

Figure 1:
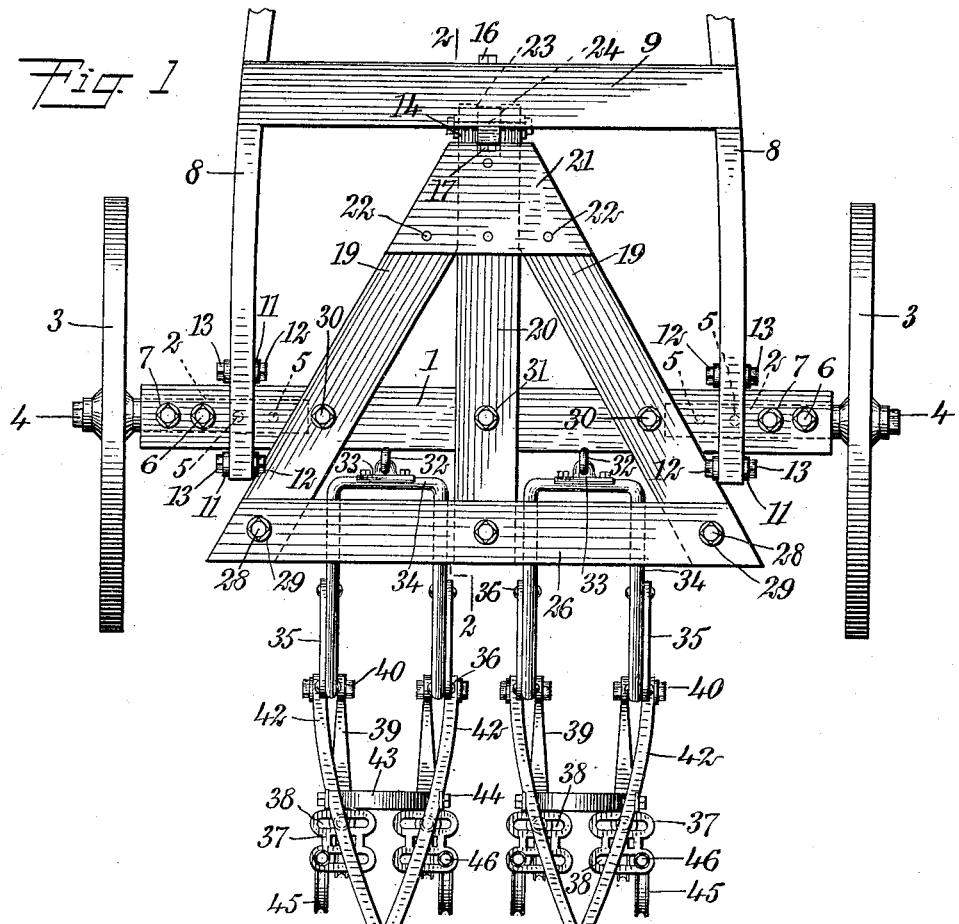
Figure 2:
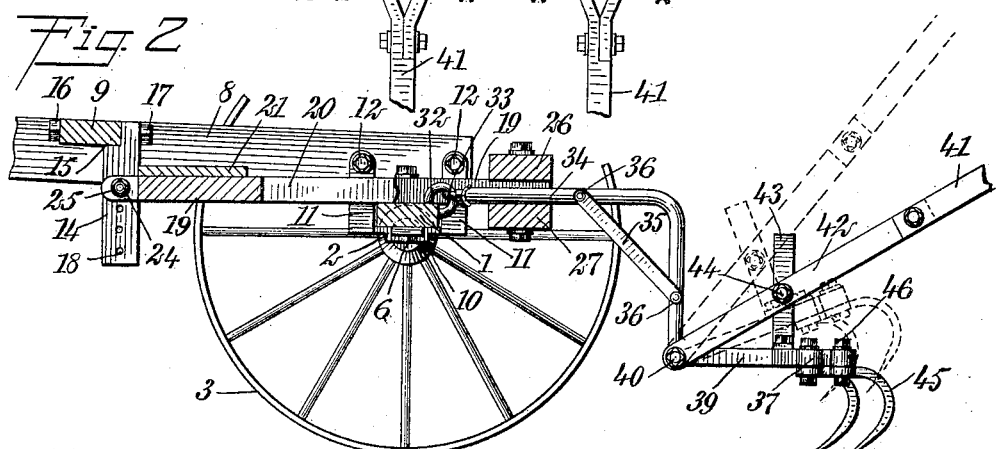

Reference is to be had to the accompanying drawings forming a part of this specification, in which similar characters of reference indicate corresponding parts in both views, and in which Figure 1 is a plan view of my invention; and Fig. 2 is a vertical longitudinal section on the line 2—2 of Fig. 1, showing certain parts in different positions, in dotted outline.

Referring more particularly to the drawings, 1 represents a transverse axle beam which may be of wood, metal or any other suitable material. Near the opposite ends, at the under side, the axle has plate members 2 preferably of metal, and terminating in journals of common form, upon which are mounted suitable wheels 3 held in position by nuts 4 of the usual type. The plate members 2 have a plurality of openings 5 therethrough and are secured in position by means of bolts 6 passing through the openings 5 in the members 2 and located in suitable openings in the axle 1; the bolts 6 are held in position by nuts 7. I prefer to use a pair of bolts for each plate member. As the plate members have a plurality of the openings 5 they can be mounted upon the axle 1 in a plurality of positions and consequently, the distance between the wheels can be suitably regulated in accordance with the width of the rows to be plowed or cultivated. Shafts 8 joined by a cross-bar 9 are mounted upon the axle 1 and serve to secure the draft animal to the plow. The rear ends of the shaft 8 are arranged upon the upper side of the axle 1 and are secured in position by means of brackets 10 which rest against the under side of the axle and have offset portions to span the plate members 2. At the ends which project beyond the sides of the axle, the brackets 10 have upwardly disposed forks 11, the arms of which are arranged at opposite sides of the shafts 8 and which are secured in position by means of bolts 12 which pass through the shafts, and nuts 13. While the shafts are preferably of wood, the brackets and forks should be of suitable material such as cast-iron or other material. By means of the brackets and forks the shafts are rigidly mounted upon the axle but nevertheless have a certain play with respect to the latter.

An upright 14 has a cut-away section 15 near the upper end and is mounted at the cross-bar 9 by means of a bolt 16 and a nut 17. The arrangement is such that a shoulder of the cut-away section rests against the under side of the cross-bar, while an adjacent side of the cut-away section abuts against the rear edge of the cross-bar as is shown most clearly in Fig. 2. The upright 14 has a plurality of openings 18 therethrough. A frame which is substantially triangular in form, with the apex toward the front of the plow, is arranged upon the axle 1 and consists of mutually inclined lateral members 19 and a central member 20, which lie in the same plane. A joining member 21 is arranged near the apex of the frame and is secured to the side members and the central member by means of screws or bolts 22. The central member 20, projects beyond the forward edge of the joining member and has a recess 23 which engages with the upright 14. The central member 20 is removably mounted upon the upright by means of a bolt 24 and a nut 25, the bolt passing through the central member and an opening 18 of the upright. At the back, the frame has similar cross-members 26 and 27 carried at the upper and lower sides respectively, of the side members and the central member, and secured in position by means of bolts 28 and nuts 29. The cross members 26 and 27 present slots therebetween for a purpose which will appear hereinafter. The frame is rigidly mounted upon the axle by means of bolts 30 and nuts 31, the bolts passing through the side and central members and the axle. Thus as the front of the frame is raised or lowered for adjustment the axle, the journals of which are free to revolve within the wheel hubs is turned with the frame.

At the rear edge, the axle has eyes 32 at which are mounted eye-brackets 33 carried by bifurcated or U-shaped members 34, which extend through the slots between the members 26 and 27, and have the extremities beyond the latter downwardly disposed and provided with openings therethrough. Braces 35 extend from the downwardly disposed extremities to the legs of the U-shaped members, and are secured in position by means of rivets 36. Brackets 37 having slots 38 and shanks 39, are pivoted at the extremities of the U-shaped members by means of bolts 40, upon which are similarly pivoted the forks 42 of handles 41. A yoke 43 joins the brackets of each pair carried by each U-shaped member, and is secured by means of bolts 44 to the fork 42 of the handles. Thus by means of the handles, the brackets can be operated pivotally, and can be swung from an operative to an inoperative position about the pivotal points at the extremities of the U-shaped members, and vice versa. Plow-shares 45 or other blades for cultivating purposes, are removably and adjustably carried at the brackets 37 by means of the bolts 46 arranged in the slots 38. The brackets may be of any convenient size and may be provided with a plurality of slots so that any suitable number of blades can be arranged thereupon. I prefer to construct the members and brackets of any suitable material, preferably cast-iron or other metal.

The position of the U-shaped members 34 can be regulated by raising or lowering of the frame; as the latter is rigid with the axle, the same will be turned when the forward part of the frame is raised or lowered to adjust it. The shafts are secured to the draft animal and are held at substantially a uniform distance from the ground, sufficient play being given by the brackets 10 to permit a slight movement of the axle with respect to the shafts. The blades 45 can be thrown in or out of engagement with the ground by means of the handles 41, which are used in the same manner as the handles of an ordinary plow as far as guiding the device is concerned, while serving the additional purpose of adjusting the blades.

Having thus described my invention I claim as new and desire to secure by Letters Patent:—

1. In a plow, a wheeled frame having an axle and provided with an opening, said frame being adjustable at a point remote from said axle, a member hinged to said axle and having arms extending through said opening, plow-shares carried by said arms, and a handle for controlling said plow shares.

2. In a plow, a wheeled frame having an axle and provided with an opening, said frame being adjustably held at a point remote from said axle, a bifurcated member hinged to said axle and extending through said opening, plow shares carried by said member, and a handle pivoted upon said member and controlling said plow-shares.

3. In a plow, an axle, a frame rigid with said axle and adjustably held at a point remote from said axle, said frame presenting a slot, a bifurcated member hinged to said axle and extending through said slot, brackets pivoted at the ends of said member, plow-shares removably and adjustably mounted upon said brackets, and a handle pivoted at said member and controlling said brackets.

4. In a plow, an axle, a frame rigid with said axle and adjustably held at a point remote from said axle, said frame presenting a slot, U-shaped member hinged to said axle and extending through said slot, said member having downwardly-disposed extremities beyond said frame, brackets pivoted at said extremities, a yoke connecting said brackets, plow-shares removably and adjustably mounted upon said brackets, and a handle pivoted at said member and secured to said yoke to control said brackets.

5. In a plow, an axle, shafts rigidly secured to said axle and having a connecting cross-bar, said cross-bar having an upright, a frame rigid with said axle and presenting a recess engaging said upright, means for removably securing said frame to said upright in a plurality of positions, said frame having an opening a bifurcated member hinged to said axle and engaging said opening of said frame, and a plow removably and adjustably carried by said member.

6. In a plow, an axle, shafts rigidly mounted upon said axle and having a connecting cross-bar, said cross-bar having an upright presenting a plurality of openings, a frame comprising a central member and converging side members, said central member having a recess engaging said upright, said central member having a bolt adapted to be removably arranged in one of said openings of said upright, said frame having a slot a bifurcated member hinged to said axle and engaging said frame, and plow-shares removably and adjustably held by said member.

7. In a plow, an axle, journal members each having a plurality of openings therethrough and carrying a wheel, bolts passing through said axle and openings of said journal members, whereby the same are adjustably mounted upon said axle, a frame carried upon said axle and adjustably held at a point remote from said axle, a member hinged to said axle and engaging said frame, and a plow-share removably carried by said member.

8. In a plow, an axle, shafts secured to said axle and having a connecting cross-bar, said cross-bar having an upright, a frame rigid with said axle and presenting a recess engaging said upright, means for removably securing said frame to said upright in a plurality of positions, a member hinged to said axle and engaging said frame, a bracket pivoted at said member, a plow-share removably and adjustably mounted upon said bracket, and a handle pivoted at said member and controlling said bracket.

9. In a plow, an axle, shafts secured to said axle and having a connecting cross-bar, said cross-bar having an upright, a frame rigid with said axle and presenting a recess engaging said upright, means for removably securing said frame to said upright in a plurality of positions, a member hinged to said axle and controlled by said frame, and a plow removably and adjustably carried by said member.

10. In a plow, an axle, shafts secured to said axle and having a connecting cross bar, said cross bar having an upright, a frame rigid with said axle and presenting a recess engaging said upright, means for removably securing said frame to said upright in a plurality of positions, a bifurcated member hinged to said axle and engaging said frame, brackets pivoted at the ends of said member, plow-shares removably and adjustably mounted upon said brackets, and a handle pivoted at said member and controlling said brackets.

11. In a plow, an axle, shafts mounted upon said axle and having a connecting cross-bar, said cross-bar having an upright presenting a plurality of openings, a frame comprising a central member and converging side members, said central member having a recess engaging said upright, and being provided with a bolt adapted to be removably located in one of said openings of said upright, said frame presenting a slot, a bifurcated member hinged to said axle and extending through said slot, brackets pivoted at the ends of said member and presenting slots, plow-shares removably and adjustably mounted in said slots of said brackets, and a handle pivoted at said member and controlling said brackets.

12. In a plow, an axle, shafts secured to said axle and having a connecting cross-bar, said cross-bar having an upright, a frame rigid with said axle and presenting a recess engaging said upright, means for removably securing said frame to said upright in a plurality of positions, journal members, each having a plurality of openings therethrough and carrying wheels, bolts passing through the axle and openings of said journal members, whereby the same are adjustably mounted upon said axle, said frame presenting a slot, a member hinged to said axle and extending through said slot, a bracket pivoted at said member, a plow-share removably and adjustably mounted upon said bracket, and a handle pivoted at said member and controlling said bracket.

In testimony whereof I have signed my name to this specification in the presence of two subscribing witnesses.

WILLIAM H. GOLDTRAP.

Witnesses:
   B. WILDENTHAL,
   L. A. KERR.